United States Patent
Shao et al.

(10) Patent No.: US 11,741,565 B1
(45) Date of Patent: Aug. 29, 2023

(54) METHOD, INTERNET OF THINGS SYSTEM AND STORAGE MEDIUM OF PUBLIC TRANSPORT MANAGEMENT IN A SMART URBAN

(71) Applicant: CHENGDU QINCHUAN IOT TECHNOLOGY CO., LTD., Sichuan (CN)

(72) Inventors: Zehua Shao, Chengdu (CN); Yuefei Wu, Chengdu (CN); Haitang Xiang, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/812,181

(22) Filed: Jul. 13, 2022

(30) Foreign Application Priority Data

May 24, 2022 (CN) .......................... 202210566232.8

(51) Int. Cl.
  *G06Q 50/30* (2012.01)
  *G16Y 10/40* (2020.01)
  *G06Q 10/0631* (2023.01)

(52) U.S. Cl.
  CPC ....... *G06Q 50/30* (2013.01); *G06Q 10/06311* (2013.01); *G06Q 10/06315* (2013.01); *G16Y 10/40* (2020.01)

(58) Field of Classification Search
  CPC ....... G06Q 10/06315; G06Q 10/06311; G06Q 50/30; G16Y 10/40
  See application file for complete search history.

(56) References Cited

U.S. PATENT DOCUMENTS

| | | | |
|---|---|---|---|
| 2015/0348068 A1* | 12/2015 | Fei | G06Q 10/06393 705/7.31 |
| 2017/0032291 A1 | 2/2017 | Liu | |
| 2017/0132914 A1* | 5/2017 | Dannat | G01C 21/3492 |

FOREIGN PATENT DOCUMENTS

| CN | 102226929 A | 10/2011 |
|---|---|---|
| CN | 104732756 A | 6/2015 |

(Continued)

OTHER PUBLICATIONS

"Passenger Flow Prediction in Traffic System Based on Deep Neural Networks and Transfer Learning Method", by Xu et al., Key Laboratory of Machine Perception, School of Electronics Engineering and Computer Science, Peking University, Beijing, China. IEEE 2019. (Year: 2019).*

(Continued)

*Primary Examiner* — Pan G Choy
(74) *Attorney, Agent, or Firm* — Metis IP LLC

(57) ABSTRACT

A method of smart urban public transport management, an Internet of Things system, and a storage medium are provided. The method of smart urban public transport management is implemented by the public transport management platform. The method of smart urban public transport management includes: obtaining the predicted pedestrian flow at a plurality of places through the place management platform; determining the target places where the predicted pedestrian flow is greater than the pedestrian flow threshold based on the predicted pedestrian flow at the plurality of places; obtaining the bus lines passing by the target places and adjusting the departure frequency of the bus lines. The Internet of Things system includes a user platform, a service platform, a public transport management platform, a sensor network platform, and an object platform. The method can (Continued)

be executed after the computer instructions stored in the computer-readable storage medium are read.

10 Claims, 7 Drawing Sheets

(56) References Cited

FOREIGN PATENT DOCUMENTS

| CN | 102903163 B | * | 12/2016 | |
|---|---|---|---|---|
| CN | 107194491 A | * | 9/2017 | ............. G06Q 10/04 |
| CN | 108694464 A | * | 10/2018 | ............. G06Q 10/04 |
| CN | 108694464 A | | 10/2018 | |
| CN | 109034449 A | * | 12/2018 | ............. G06Q 10/04 |
| CN | 109034449 A | | 12/2018 | |
| CN | 111354212 A | | 6/2020 | |
| CN | 112417753 A | | 2/2021 | |
| CN | 112562378 A | | 3/2021 | |
| CN | 112562378 A | * | 3/2021 | ............... G07C 9/00 |
| CN | 112767685 A | * | 5/2021 | |
| CN | 113657934 A | * | 11/2021 | ......... G06Q 30/0203 |
| CN | 114091757 A | * | 2/2022 | ....... G06Q 10/06315 |
| WO | 2015096400 A1 | | 7/2015 | |

OTHER PUBLICATIONS

Lai et al., "Identification Method of Residence and Employment Locations Based on Cellular Phone Data", College of metropolitan Transportation, Beijing University of Technology, Beijing, China. Journal of Networks, vol. 9, No. 8, Aug. 2014. (Year: 2014).*

Chiu et al., "Identifying key grid cells for crowd flow predictions based on CNN-based models with the Grad-CAM kid", The authors, under exclusive licence to Springer Science Business Media, LLD. Applied Intelligence (2023) 53:13323-13351. (Year: 2023).*

Ozbil et al., "Comparative Associations of Street Network Design, Streetscape Attributes and and Land-Use Characteristics on Pedestrian Flows in Peripheral Neighborhoods", International Journal of Environmental Research and Public Health. May 2019. (Year: 2019).*

Li et al., "Dynamic Optimization of Bus Line Schedule in Commuter Corridor Based on Bus IC Card Data", General Aviation Technology Beijing Laboratory, Beijing University of Civil Engineering and Architecture, Beijing 100044, China. Journal of Advanced Transportation vol. 2022, ID 7064061, p. 10. (Year: 2022).*

Shao, Zehua, Exploration and Research on the Structure of Internet of Things, Internet of Things Technologies Reliable Transmission, 2015, 10 pages.

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

First Office Action in Chinese Application No. 202210566232.8 dated Jul. 15, 2022, 11 pages.

Decision to Grant a Patent for Invention in Chinese Application No. 202210566232.8 dated Jul. 25, 2022, 3 pages.

* cited by examiner

300

310 — Obtain the predicted pedestrian flow at a plurality of places through the place management platform 320 — Determine target places where the predicted pedestrian flow is greater than the pedestrian flow threshold based on the predicted pedestrian flow at the plurality of places 330 — Obtain the bus lines passing by the target places, and adjust the departure frequency of the bus lines

FIG. 3

METHOD, INTERNET OF THINGS SYSTEM AND STORAGE MEDIUM OF PUBLIC TRANSPORT MANAGEMENT IN A SMART URBAN

CROSS-REFERENCE TO RELATED APPLICATIONS

This application claims priority to Chinese Patent Application No. 202210566232.8, filed on May 24, 2022, the contents of which are hereby incorporated by reference to its entirety.

TECHNICAL FIELD

The present disclosure relates to the field of Internet of Things and cloud platforms, and in particular to a method of public transport management in a smart urban, Internet of Things system, and storage medium.

BACKGROUND

With the development of information science and technology, the concept of the cloud platform and its application in the Internet of Things are increasingly mentioned. At present, the basis of public transport management is relatively single, and it is generally judged on common experience. In modern society, one or several places are often crowded or have a large pedestrian flow in a plurality of places, and there is a large demand for bus lines, while other places are sparsely populated or the pedestrian flow is small, and the demand for bus lines is small. Such situations cannot be predicted based on common experience, which will lead to a decrease in the operational efficiency of public transport management, and long wait times for users, so it is impossible to avoid the gathering of people.

Therefore, it is desirable to provide a method of public transport management in a smart urban, an Internet of things system, and a storage medium. The Internet of Things and cloud platforms can be used to grasp the situation of public transport in different areas of a city in real-time, so as to avoid crowd gathering, reduce the waiting time for users to take a bus, and improve the operation efficiency of public transport.

SUMMARY

One aspect of some embodiments of the present disclosure provides a method of public transport management in a smart urban. The method of public transport management in a smart urban may be performed by a public transport management platform, the method comprising: obtaining predicted pedestrian flow at a plurality of places through a place management platform; determining target places where the predicted pedestrian flow is greater than a pedestrian flow threshold based on the predicted pedestrian flow at the plurality of places; and obtaining bus lines passing by target places, and adjusting departure frequency of the bus lines.

One aspect of some embodiments of the present disclosure provides an Internet of Things system of public transport management in a smart urban. The Internet of Things system may include a user platform, a service platform, a public transport management platform, a sensor network platform, and an object platform, and the public transport management platform may be configured to perform the following operations: obtaining the predicted pedestrian flow at plurality of places through a place management platform; determining target places where the predicted pedestrian flow is greater than a pedestrian flow threshold based on the predicted pedestrian flow at the plurality of places; obtaining bus lines passing by the target places, and adjusting the departure frequency of the bus lines.

One aspect of some embodiments of the present disclosure provides a computer-readable storage medium storing computer instructions, wherein when reading the computer instructions in the storage medium, a computer executes the method of public transport management in a smart urban described in any of the above.

BRIEF DESCRIPTION OF THE DRAWINGS

The present disclosure is further described in terms of exemplary embodiments, and these exemplary embodiments are described in detail with reference to the drawings. These embodiments are non-limiting exemplary embodiments, in which the same number represents the same structure, wherein:

FIG. 3 is a flowchart illustrating an exemplary process of a method of public transport management in a smart urban according to some embodiments of the present disclosure;

DETAILED DESCRIPTION

Figure 1:
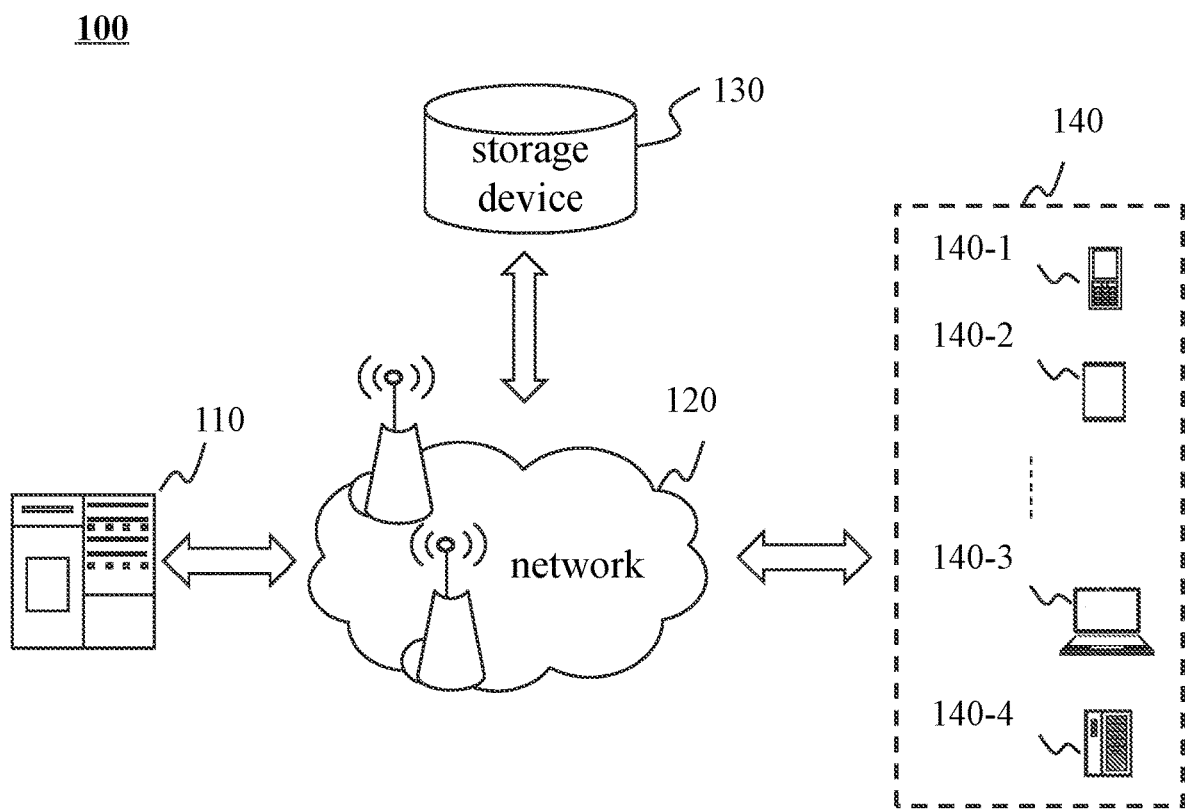
FIG. 1 is a schematic diagram illustrating an exemplary application scenario of an Internet of Things system of public transport management in a smart urban according to some embodiments of the present disclosure.

In order to illustrate the technical solution of the embodiment of the present disclosure more clearly, the following briefly introduces the accompanying drawings that are used in the description of the embodiments. Obviously, the drawings described below are only some examples or embodiments of the present disclosure. For those skilled in the art, the present disclosure may also be applied to other similar situations according to these drawings without paying further creative efforts. It will be understood that the purposes of these illustrated embodiments are only provided to those skilled in the art to practice the application, and are not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

As shown in the description and the claims, the singular forms "a," "an," "one," and/or "the" may be intended to include plural forms as well, unless the context clearly indicates otherwise; the plural forms may be intended to include singular forms as well, unless the context clearly indicates otherwise. In general, the terms "include" and/or "comprise" only imply that the clearly identified steps and elements are included, and these steps and elements do not constitute an exclusive list, and the method or device may also contain other steps or elements.

The flowcharts used in the present disclosure illustrate operations that the systems implement according to some embodiments of the present disclosure. It will be understood that the preceding or following operations may not necessarily implemented accurately in order. Conversely, each step may be implemented in an inverted order, or simultaneously. Moreover, other operations may also be added to the flowcharts, or one or more operations may be removed from the flowcharts.

FIG. 1 is a schematic diagram illustrating an exemplary application scenario of the Internet of Things system of public transport management in a smart urban according to some embodiments of the present disclosure.

In some embodiments, the application scenario 100 of the Internet of Things system of public transport management in a smart urban may include a processing device 110, a network 120, a storage device 130, and a terminal device 140. In some embodiments, the components in the application scenario 100 may connect and/or communicate with each other through the network 120 (e.g., a wireless connection, a wired connection, or a combination thereof). For example, the processing device 110 may be connected to the storage device 130 through the network 120.

In some embodiments, the processing device 110 may process information and/or data related to the application scenario 100 of the Internet of Things system of public transport management in a smart urban to perform one or more functions described in the present disclosure. For example, the processing device 110 may determine the target places where the predicted pedestrian flow is greater than the pedestrian flow threshold based on the predicted pedestrian flow at plurality of places. As another example, the processing device 110 may obtain the bus lines passing by the target places and adjust the departure frequency of the bus lines. In some embodiments, the processing device 110 may include one or more processing engines (e.g., a single-chip processing engine or a multi-chip processing engine). Merely as an example, the processing device 110 may include a Central Processing Unit (CPU). The processing device 110 may process data, information, and/or processed results obtained from other devices or system components, and execute program instructions based on the data, information, and/or processed results to perform one or more functions described in the present disclosure.

The network 120 may include any suitable network that provides information and/or data exchange capable of facilitating the Internet of Things system of public transport management in a smart urban. One or more components (e.g., the processing device 110, the storage device 130, the terminal device 140) of Internet of Things system of public transport management in a smart urban may exchange information and/or data through the network 120. For example, the network 120 may send the bus lines passing by the target places to the processing device 110. In some embodiments, the network 120 may be any one or more of a wired network or a wireless network. In some embodiments, the network 120 may include one or more network access points. For example, the network 120 may include a wired or a wireless network access point. In some embodiments, the network may be a variety of topologies or a combination of a variety of topologies such as point-to-point, shared and centralized.

The storage device 130 may be configured to store data, instructions, and/or any other information. In some embodiments, the storage device 130 may store data and/or information obtained from the processing device 110 and the terminal device 140. For example, the storage device 130 may store the predicted pedestrian flow, the bus lines passing by the target places, the person capacity of the plurality of places, the departure frequency of the bus lines, or the like. In some embodiments, the storage device 130 may be provided in the processing device 110. In some embodiments, the storage device 130 may include mass memory, removable memory, or the like, or any combination thereof.

The terminal device 140 may refer to one or more terminal devices or software used by the users. The users may be individuals or groups with query requests. For example, the users may include truck drivers, individuals, enterprises, etc. In some embodiments, the terminal device 140 may be a terminal used by the users. For example, terminals (e.g., mobile phones) are used by users in the plurality of places. In some embodiments, the terminal device 140 may include a mobile device 140-1, a tablet computer 140-2, a notebook computer 140-3, a laptop computer 140-4, or the like, or any combination thereof. In some embodiments, the terminal device 140 may include other intelligent terminals, such as wearable intelligent terminals. The above example is only used to illustrate the universality of the scope of the user terminal device and not to limit the scope thereof.

It should be noted that the application scenario 100 of the Internet of Things system of public transport management in a smart urban is provided for illustrative purposes only and is not intended to limit the scope of the present disclosure. For those skilled in the art, various modifications or changes may be made according to the description of the present disclosure. For example, the application scenario 100 of the Internet of Things system of public transport management in a smart urban may realize similar or different functions on other devices. However, these modifications or changes will not deviate from the scope of the present disclosure.

The Internet of Things system is an information processing system that includes a user platform, a service platform, a management platform, a sensor network platform, and part of the platform or all platforms. The user platform may refer to a platform dominated by users, which may obtain users' needs and feedback information to users. The service platform may refer to a platform for users to provide input service and output service. The management platform may realize the overall planning and coordination of the connection and cooperation between various functional platforms, gather the information about the Internet of Things operation system, and provide the perception management and control management function for the Internet of Things operation system. The sensor network platform may realize the function of connecting the management platform and the object platform, which plays a function of perception information sensing communication and control information sensing communication. The object platform may be a functional platform for perception information generation and control information execution.

The information processing in the Internet of Things system may be divided into the processing flow of perception information and the processing flow of control information, wherein the control information may be the information generated based on the perception information. The processing of the perception information may be that the object platform obtains the perception information and transmits it to the management platform through the sensor network platform. The management platform may transmit the calculated perception information to the service platform and the user platform. After judging and analyzing the perception information, the user platform may generate the control information. The control information may be generated by the user platform and sent to the service platform. The service platform may transmit the control information to the management platform. The management platform may calculate and process the control information and send it to the object platform through the sensor network platform, so as to realize the control of the corresponding object.

In some embodiments, when the Internet of Things system is applied to the public transport management in a smart urban, the Internet of Things system may refer to the Internet of Things system of public transport management in a smart urban.

Figure 2:
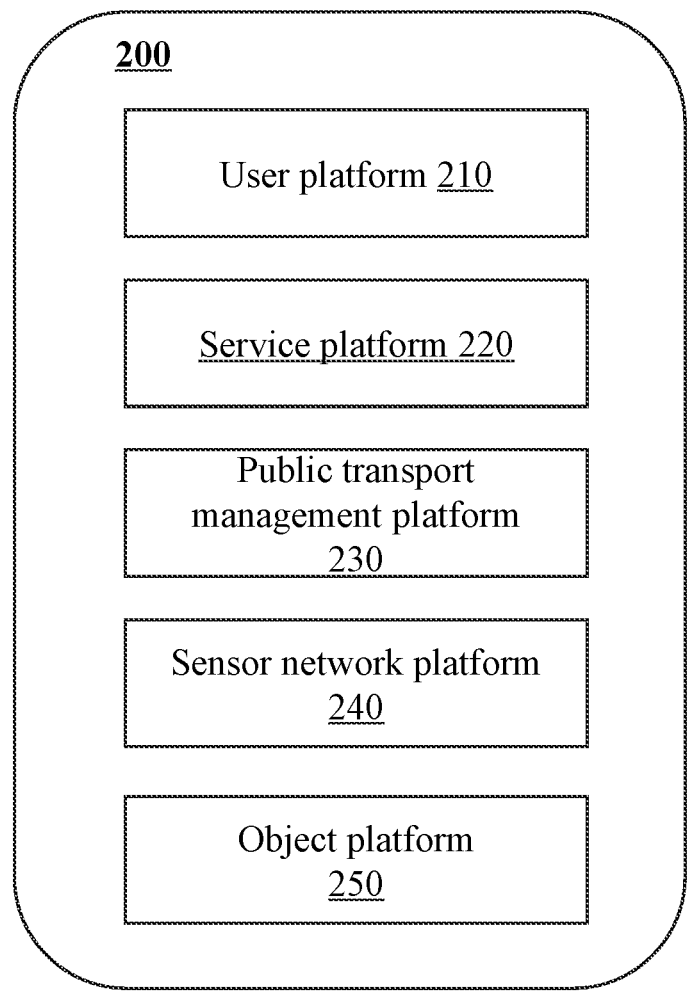
FIG. 2 is a schematic diagram illustrating an exemplary Internet of Things system of public transport management in a smart urban according to some embodiments of the present disclosure.

FIG. 2 is a schematic diagram illustrating an exemplary Internet of Things system of public transport management in a smart urban according to some embodiments of the present disclosure. The Internet of Things system 200 of public transport management in a smart urban may include a user platform 210, a service platform 220, a public transport management platform 230, a sensor network platform 240, and an object platform 250. In some embodiments, the Internet of Things system of public transport management in a smart urban may be implemented by part or all of the processing device 110.

The user platform 210 may refer to a user-led platform. For example, the user platform may obtain the user's input instruction through the terminal (e.g., terminal device 140) and query whether the departure frequency of the bus line is adjusted. For another example, the user platform may feedback to the user whether the departure frequency of the bus line is adjusted to the user.

The service platform 220 may refer to a platform that may provide input service and output service for the user. For example, the service platform may send the user's input instruction to the public transport management platform 230 by the user platform, or the like.

The public transport management platform 230 may refer to a platform that coordinates the connection and cooperation between the various functional platforms, gather all the information about the Internet of Things, and provide functions of perception management and control management for the Internet of Things operation system. For example, the public transport management platform may obtain predicted pedestrian flow at the plurality of places through the place management platform. The public transport management platform may determine the target places where the predicted pedestrian flow is greater than the pedestrian flow threshold based on the predicted pedestrian flow at the plurality of places. The public transport management platform may obtain the bus lines passing by the target places and adjust the departure frequency of the bus lines. The public transport management platform may include the processing device in FIG. 1 and other components. In some embodiments, the public transport management platform may be a remote platform controlled by managers, artificial intelligence, or preset rules. In some embodiments, the public transport management platform may be controlled by the executive agency, such as a government department.

For more details about the public transport management platform, please refer to the relevant description in FIG. 3-FIG. 7.

The sensor network platform 240 may refer to a platform that receives and transmits information and/or data. The sensor network platform 240 may connect the public transport management platform 230 and the object platform 250. In some embodiments, the sensor network platform 240 may send the information obtained by the object platform 250 to the public transport management platform 230, or the sensor network platform 240 may transmit an instruction to the object platform 250 based on the instruction information of the public transport management platform 230. For example, the public transport management platform may obtain the first number of bus passengers through the object platform based on the sensor network platform.

The object platform 250 may refer to a functional platform for perception information generation. In some embodiments, the object platform may include a ticket checking device, an imaging monitoring device, or the like. In some embodiments, the object platform may obtain data. For example, the object platform may obtain the first number of bus passengers. The public transport management platform 230 may obtain data from the object platform based on the sensor network platform through the network.

In some embodiments, the public transport management platform 230 may communicate with one or more off-Internet-of-Things cloud platforms. The public transport management platform 230 may obtain relevant auxiliary data through the off-Internet-of-Things cloud platform. In some embodiments, one or more off-Internet-of-Things cloud platforms may include a place management platform, an epidemic management platform, a taxi/online car-hailing management platform, etc.

The place management platform may refer to a functional platform for the overall management of the plurality of places. The place management platform may obtain and/or store a variety of information of the plurality of places. For example, the place management platform may obtain and store the place information of different places through the network 120, such as a type of place, a name of place, an address of place, etc. As another example, the place management platform may obtain predicted pedestrian flow at the different places. The place management platform may obtain the mobile phone signals and/or the time information of the mobile phone signals through a mobile phone signal collection device.

The epidemic management platform may refer to a functional platform for the overall management of the epidemic. The epidemic management platform may count whether the city contains high-risk or medium-risk areas and the number of medium/high-risk areas. The epidemic management platform may also count whether a bus line in the city passing by the medium/high-risk areas and the distance between the bus line and medium/high-risk areas. The epidemic management platform may update the epidemic situation of a city in real-time. In some embodiments, code scanning admission data and/or person capacity of the target places and/or the relevant places may be obtained through the epidemic management platform. For example, the code scanning information collection device may upload the relevant code scanning admission data to the epidemic management platform. The epidemic management platform may receive and store relevant code scanning admission data. The epidemic management platform may obtain the corresponding person capacity of different places through the network and store it.

The taxi/online car-hailing management platform may refer to a functional platform for the overall management of taxi/online car-hailing. The taxi/online car-hailing management platform may comprehensively manage a plurality of taxis/online car-hailing, for example, receiving the user's ride request, dispatching, etc. The taxi/online car-hailing management platform may obtain a variety of information. The variety of information may include the number of passengers, taxi location, alighting location, alighting time, etc. The taxi/online car-hailing management platform may obtain the second number of passengers. The second number of passengers may refer to the number of passengers who arrive at the target place by taxi/online car-hailing in a period of time before the current time.

In some embodiments, the Internet of Things system 200 of public transport management in a smart urban may be applied to a variety of scenarios of the public transport management. In some embodiments, the Internet of Things system 200 of public transport management in a smart urban may respectively obtain the relevant data of public transport in various scenarios, so as to obtain the strategies of public transport management in each scenario, for example, data related to freight transportation, bus routes, etc. In some embodiments, the Internet of Things system 200 of public transport management in a smart urban may obtain the strategy of public transport management of the whole region (such as the whole city, several adjacent cities, the whole country, etc.) based on obtaining a variety of relevant data of public transport management in various scenarios.

The various scenarios of public transport management may include, for example, freight transportation scenario, bus line scenario, etc. For example, it may include public transport management of freight transportation, public transport management of bus line, or the like. It should be noted that the above scenarios are only examples and do not limit the specific application scenarios of the Internet of Things system 200 of public transport management in a smart urban. Those skilled in the art may apply the Internet of Things system 200 of public transport management in a smart urban to any other suitable scenarios on the basis of the contents disclosed in this embodiment.

In some embodiments, the Internet of Things system 200 of public transport management in a smart urban may be applied to the public transport management of freight transportation. When applied to the public transport management of freight transportation, the user platform may obtain the user's query request about the freight transportation. For example, whether trucks can pass by a certain area, whether trucks are prohibited to enter several highways, whether a certain area is an epidemic area, etc. The user platform may send the user's query request about the freight transportation to the service platform. The service platform may send the user's query request about the freight transportation to the public transport management platform. The public transport management platform may obtain relevant data through one or more off-Internet-of-Things cloud platforms. The off-Internet-of-Things cloud platform may include a place management platform, an epidemic management platform, etc. The public transport management platform may also obtain relevant data through the object platform based on the sensor network platform, and make strategies or instructions related to the public transport management of the freight transportation based on the processing of collected data. For example, trucks can pass by a certain area, trucks are prohibited to enter a certain highway, and trucks cannot pass by an epidemic area, etc. The public transport management platform may send the above strategies or instructions to the service platform. The service platform may send the above strategies or instructions to the user platform, and the user platform may send the above strategies or instructions to the user. The user may select the mode of freight transportation according to the above strategies or instructions.

In some embodiments, the Internet of Things system of public transport management in a smart urban may be applied to the public transport management of bus lines. When applied to the public transport management of bus lines, the user platform may obtain the user's query request about the bus lines. For example, whether the departure frequency of a bus line is adjusted, whether a bus line is stopped, whether a bus line passes by the epidemic area, etc. The user platform may send the user's query request about the bus lines to the service platform. The service platform may send the user's query request about the bus lines to the public transport management platform. The public transport management platform may obtain relevant data through one or more off-Internet-of-Things cloud platforms. The off-Internet-of-Things cloud platform may include a place management platform, an epidemic management platform, a taxi/online car-hailing management platform, etc. The public transport management platform may also obtain relevant data through the object platform based on the sensor network platform, and make strategies or instructions related to public transport management of the bus lines based on the processing of collected data. For example, the departure frequency of a certain bus line is increased, a certain bus line is out of service, a certain bus line passes by the epidemic area, etc. The public transport management platform may send the above strategies or instructions to the service platform. The service platform may send the above strategies or instructions to the user platform. The user platform may send the above strategies or instructions to the user. The user selects the mode of riding according to the above strategies or instructions.

In some embodiments, the Internet of Things system 200 of public transport management may be composed of the plurality of sub-systems of public transport management, and each sub-system may be applied to one scenario. The Internet of Things system 200 of public transport management in a smart urban may comprehensively manage and process the data obtained and output by each sub-system, and obtain relevant strategies or instructions for assisting public transport management.

For example, the Internet of Things system 200 of public transport management in a smart urban may include a sub-system applied to the public transport management of freight transportation and a sub-system applied to the public transportation management of bus lines, respectively. The Internet of Things system 200 of public transport management in a smart urban serve as the upper-system of each sub-system.

The following will take the Internet of Things system 200 of public transport management in a smart urban managing each sub-system and obtaining corresponding data based on the sub-system to obtain the strategy of public transport management as an example to illustrate.

The Internet of Things system 200 of public transport management in a smart urban may obtain relevant data such as whether trucks can pass by a certain area, whether trucks are prohibited to enter a certain highway, and trucks cannot pass by an epidemic area based on the sub-system of public transport management of freight transportation. The Internet of Things system 200 of public transport management in a smart urban may obtain the relevant data such as the increasing in the departure frequency of a certain bus line, the shutdown of a certain bus line, and the passing by of a certain bus line by an epidemic area based on the sub-system of public transport management of bus lines.

After obtaining the above data, the Internet of Things system 200 of public transport management in a smart urban may perform summary processing on the collected data. The public transport management platform may make data related to public transport management based on the processing of the collected data.

For example, the public transport management platform may determine the prevention and control policy of a certain area based on a fact that the certain area is an inaccessible epidemic area. A financial management platform may determine whether a bus line is shutdown based on a fact that the bus line passes by the epidemic area. The financial management platform may determine whether a bus line is shutdown based on the prevention and control policy of one of the above areas. The financial management platform may further determine the overall public transport status of a certain area.

For those skilled in the art, after understanding the principle of the system, it is possible to transfer the system to any other suitable scenario without departing from this principle.

The following will take the application of the Internet of Things system 200 of public transport management in a smart urban to a public transport management of bus line scenario as an example to explain the Internet of Things system 200 of public transport management in a smart urban in detail.

In some embodiments, the public transport management platform may be configured to obtain the predicted pedestrian flow at the plurality of places through the place management platform, determine the target places where predicted pedestrian flow is greater than the pedestrian flow threshold based on the predicted pedestrian flow at the plurality of places, and obtain the bus lines passing by the target places and adjust the departure frequency of the bus lines.

In some embodiments, the predicted pedestrian flow may include the first pedestrian flow. The public transport management platform may be configured to obtain at least one of the basic information of a plurality of places, the mobile phone signals or the time information of mobile phone signals through the place management platform. The basic information may include the type of place. The mobile phone signals may refer to the data obtained by mobile phone signal collecting device in the plurality of places and/or related places. The time information of the mobile phone signal may include the start time of the mobile phone signals and the end time of the mobile signals. The public transport management platform may predict the first pedestrian flow by processing the at least one of the basic information of the plurality of places, the mobile phone signals or the time information of the mobile phone signals based on the first pedestrian flow prediction model.

In some embodiments, the first pedestrian flow prediction model may be a LSTM model and/or a DNN model. The public transport management platform may also be configured to process the code scanning admission data in a plurality of time periods before the current time based on the LSTM model through the place management platform, so as to determine the processed code scanning admission data.

The public transport management platform may process the code scanning admission data and/or the basic information of the plurality of places and/or, the mobile phone signals and/or the time information of mobile phone signals and/or person capacity based on the DNN model to predict the first pedestrian flow.

In some embodiments, the public transport management platform may also be configured to obtain one of the target places; obtain one of the bus lines passing by the one of the target places based on one of the target places; predict the second pedestrian flow generated by one of the target places to one of the bus lines based on one of the bus lines.

In some embodiments, the public transport management platform may also be configured to obtain the first number of bus passengers through the object platform based on the sensor network platform; obtain the second number of passengers through the taxi/online car-hailing management platform; predict the second pedestrian flow by processing at least one of the first number of bus passengers, the second number of passengers, a proportion of various types of people to the first number of bus passengers, or a proportion of various types of people to the second number of bus passengers by the second pedestrian flow prediction model.

In some embodiments, the adjustment includes the strategy of frequency adjustment, and the public transport management platform may also be configured to determine the strategy of frequency adjustment based on the second pedestrian flow.

In some embodiments, the strategy of frequency adjustment may include the frequency range of adjustment, and the public transport management platform may also be configured to obtain the corresponding relationship between the second pedestrian flow and the frequency range; determine the frequency range of adjustment based on the corresponding relationship.

In some embodiments, the strategy of frequency adjustment may include the amplitude of adjustment, and the public transport management platform may also be configured to obtain the second confidence of the second pedestrian flow prediction model; determine the amplitude of adjustment based on the second confidence.

It will be understood that the Internet of Things system and its platform shown in FIG. 2 can be implemented in various ways. For example, the public transport management platform 230 may be disposed on the processing device 110 in FIG. 1.

It should be noted that the above description of the system and its components is only for convenience of description and cannot limit the present disclosure to the scope of the embodiments. It will be understood that after understanding the principle of the system, those skilled in the art may arbitrarily combine various components or form a subsystem to connect with other components without departing from this principle. For example, each component may share one storage device, and each component may also have its own storage device. Such deformations are within the scope of the present disclosure.

FIG. 3 is a flowchart illustrating an exemplary process of public transport management in a smart urban according to some embodiments of the present disclosure. As shown in FIG. 3, the process 300 may include the following steps. In some embodiments, the process 300 may be performed by the public transport management platform 230.

In step 310, the predicted pedestrian flow may be obtained at a plurality of places through the place management platform.

The places may refer to various public places that can provide services to users. The places may include places in the plurality of types. For example, the places in plurality of types may include entertainment places, shopping places, leisure places, educational institutions, etc. A place in a same type may include a plurality of places. For example, the entertainment places may include a plurality of parks, a plurality of scenic spots, a plurality of amusement parks, etc. The plurality of places may include a plurality of places in a variety of types.

The predicted pedestrian flow may refer to the predicted pedestrian flow for a period of time after the current time in different places, for example, 5 minutes, 10 minutes, 20 minutes after the current time. In some embodiments, different places may correspond to different predicted pedestrian flow. For example, the predicted pedestrian flow at a shopping mall may be 40 people/min. The predicted pedestrian flow at a park may be 10 people/min.

In some embodiments, the public transport management platform 230 may obtain the predicted pedestrian flow at (of) different places through the place management platform. For example, the place management platform may obtain the pedestrian flow in different places at the current time. The place management platform may predict the pedestrian flow in different places in a period of time after the current time based on the pedestrian flow in different places at the current time. The public transport management platform may obtain the pedestrian flow in different places predicted by the place management platform, and determine the pedestrian flow as the predicted pedestrian in different places.

In some embodiments, the predicted pedestrian flow may include a first pedestrian flow. The place management platform may obtain at least one of the basic information of the plurality of places, the mobile phone signals, or the time information of the mobile phone signals. The place management platform may process the at least one of the basic information of the plurality of places, the mobile phone signals or the time information of the mobile phone signals based on the first pedestrian flow prediction model, so as to predict the first pedestrian flow. Please refer to the relevant description in FIG. 4 for details.

In step 320, target places where the predicted pedestrian flow is greater than the pedestrian flow threshold may be determined based on the predicted pedestrian flow at the plurality of places.

The pedestrian flow threshold may refer to a preset value of the predicted pedestrian flow corresponding to the plurality of places. For example, the pedestrian flow threshold may be 20 people/min or 30 people/min.

The target places may refer to places where the pedestrian flow is greater than the pedestrian flow threshold.

In some embodiments, the public transport management platform may determine the places where the predicted pedestrian flow is greater than the pedestrian flow threshold as the target places based on the predicted pedestrian flow at different places. For example, the pedestrian flow threshold is 20 people/min, and the predicted pedestrian flow at 15 places of the plurality of places exceeds the pedestrian flow threshold of 20 people/min. The public transport management platform may determine the above 15 places as the target places.

In step 330, the bus lines passing by the target places may be obtained, and the departure frequency of the bus lines may be adjusted.

The bus lines may refer to lines of public transportation. The bus lines may include the lines of public transportation such as bus, subway, tram, truck, etc. In some embodiments, the bus lines may include a capacity of the public transportation, stop stations of the public transportation, a count of (or a number of) the public transportation, a real-time location of the public transportation, and a serial number of the public transportation, etc.

The bus lines passing by the target places may refer to the bus lines where the public transportation may stop at a station related to the target places. Users of the target places may take the bus with the bus lines passing by the target places.

The departure frequency may refer to the number of times of departures of public transportation per unit time. For example, the departure frequency of a bus line is 3 times/hour.

In some embodiments, the public transport management platform may obtain the bus lines passing by the target places through the network 120 and/or the storage device 130. The public transport management platform may obtain the constantly-updated bus lines through the network 120 and update the bus lines of the storage device. The public transport management platform may obtain a plurality of bus lines stored in the storage device 130, analyze and process the plurality of bus lines, and obtain the bus lines passing by the target places.

In some embodiments, the predicted pedestrian flow may include second pedestrian flow. The public transport management platform may obtain one of the target places. The public transport management platform may obtain one of the bus lines passing by the one of the target places based on the one of the target places. The public transport management platform may predict the second pedestrian flow generated by one of the target places to the one of the bus lines based on the one of the bus lines. For details about the prediction of the second pedestrian flow please refer to the relevant description in FIG. 5.

In some embodiments, the public transport management platform may adjust the departure frequency of the bus lines. For example, the public transport management platform may improve the departure frequency of bus lines passing by the target places. For example, the public transport management platform may increase the departure frequency of bus No. 11 passing by a certain mall from 3 times/hour to 5 times/hour.

In some embodiments, the public transport management platform may reduce the departure frequency of the bus lines passing by a certain place. For example, the predicted pedestrian flow at the certain place is less than a first pedestrian flow threshold. The first pedestrian flow threshold may refer to a preset value of the predicted pedestrian flow corresponding to the place. For example, the first pedestrian flow threshold may be 4 people/min or 5 people/min. For example, the predicted pedestrian flow at a certain park is 3 people/min, which is less than the first pedestrian flow threshold. The public transport management platform may reduce the departure frequency of bus lines passing by the park. For example, the bus lines passed through the park includes bus No. 68. The public transport management platform may reduce the departure frequency of bus No. 68 from 4 times/hour to 3 times/hour.

In some embodiments, adjusting the departure frequency of the bus lines includes a strategy of frequency adjustment. The public transport management platform may determine the strategy of frequency adjustment based on the second pedestrian flow. For details about this, please refer to the relevant description in FIG. 7.

In some embodiments, the public transport management platform may send the adjustment of the departure frequency of a bus line to the service platform according to a user's request. The service platform sends the adjustment of departure frequency to the user platform. The user platform sends the adjustment of the departure frequency to the user. The user selects the bus line according to the above information.

In some embodiments of the present disclosure, the public transport management platform may adjust the departure frequency of the bus lines passing by the target places. The public transport management platform may avoid crowd aggregation by increasing the departure frequency of bus lines passing by the target places with large pedestrian flow, reduce the waiting time of users, improve the operation efficiency of public transportation and improve the user experience.

In some embodiments, the public transport management platform may obtain bus stops related to the target places, and determine the distribution plan of order maintenance volunteers at the bus stops based on relevant information of the bus stops.

The bus stops related to the target places may refer to bus stops close to the target places. For example, a bus stop whose distance to a target place is less than a distance threshold. For example, the distance threshold is 300 meters, and the bus stops related to the target place are those whose distances to the target places are less than 300 meters.

In some embodiments, the public transport management platform may obtain the bus stops related to the target place through the network. For example, the public transport management platform may obtain the plurality of bus stops with a distance less than 300 meters through the network.

The relevant information of the bus stops refers to information that may reflect the characteristics of bus stops. For example, the relevant information of a bus stop may include a plurality of bus lines passing by the bus stop, the frequency of the plurality of bus lines, the predicted pedestrian flow at places within the preset distance range of the bus stop, etc.

The order maintenance volunteers may refer to volunteers responsible for maintaining the order of the bus stops.

The distribution plan may refer to how to distribute the order maintenance volunteers of the bus stop. For example, the distribution plan includes the number of volunteers corresponding to different bus stops.

In some embodiments, the public transport management platform may determine the distribution plan of order maintenance volunteers at the bus stops based on the relevant information of the bus stops. For example, the public transport management platform may determine the distribution plan of order maintenance volunteers at a bus stop according to the number of bus lines passing by the bus stop. The public transport management platform may determine the distribution plan of the order maintenance volunteers of the bus stops. For example, the distribution plan is that the number of volunteers at one bus stop in the commercial street (the number of passed bus lines is five) is one, and the number of volunteers at one bus stop in the shopping center (the number of passed bus lines is ten) is two.

In some embodiments, the public transport management platform may obtain information data of one of the bus stops. The public transport management platform may obtain the frequency of the bus lines passing the one of the bus stops based on the one of the bus stops. The public transport management platforms may obtain the predicted pedestrian flow in at least one place within the preset distance range of the one of the bus stops based on the one of the bus stops. The public transport management platform may determine the number of volunteers at one bus stop based on the frequency of the bus lines passing by the one bus stop and the predicted pedestrian flow in at least one place within the preset distance range of the one bus stop.

In some embodiments, the public transport management platform may obtain one of a plurality of bus stops related to each of the target places through the network.

The frequency of bus line may refer to the number of times of departures of the bus line per hour. For example, the bus stop is Guihua Park Station, and there are three bus lines passing by Guihua park. The three bus lines correspond to different frequencies (such as 4 times, 5 times, 6 times, etc.). The preset distance range of the bus stop may refer to an area where the distance to the bus stop is less than the preset distance. For example, the preset distance is 500 meters, and the preset distance range of the bus stop is an area within 500 meters around the bus stop. Within 500 meters of the bus stop, there may be one or more places. Different places have different predicted pedestrian flow. In some embodiments, the public transport management platform may obtain the frequency of one or more bus lines passing the bus stop through the network. In some embodiments, the public transport management platform may obtain the predicted pedestrian flow of one or more places within the preset distance range of the bus stop through the place management platform.

In some embodiments, the public transport management platform may determine the number of volunteers at a bus stop based on the frequency of the bus lines at the bus stop and the predicted pedestrian flow at one or more places within the preset distance range. For example, the number of volunteers at a bus stop is inversely proportional to the frequency of the bus line with the bus stop. The number of volunteers at the bus stop is directly proportional to the predicted pedestrian flow at one or more places within the preset distance range. In some embodiments, the public transport management platform may determine the number of volunteers at the bus stop based on the calculation formula. The public transport management platform may set the calculation formula according to the actual demand. For example, the calculation formula is $N=g/(n1+ \ldots +nm)+h(C1+ \ldots +Cp)+j$, wherein n1 to nm are the frequency of m bus lines, respectively; C1 to Cp is the predicted pedestrian flow of p places within the preset distance rang of the bus stop, g, h and j are constants, and the value of the constant can be set according to the actual demand.

In some embodiments of the present disclosure, the public transport management platform may determine the number of volunteers according to the frequency of bus lines at bus stops and the predicted pedestrian flow at one or more places within the preset distance range. Thus, it can ensure the rationality of the number of volunteers corresponding to the bus stops.

In some embodiments, the frequency of bus lines may be set by standards. In some embodiments, the frequency of the bus lines may be adjusted according to the predicted pedestrian flow. For example, the public transport management platform may determine the strategy of frequency adjustment based on the second pedestrian flow, and then adjust the frequency of bus lines. For more information on adjusting the frequency of bus lines, see the relevant description in FIG. 7.

In some embodiments of the present disclosure, the public transport management platform may adjust the frequency of the bus lines according to the predicted pedestrian flow, and then determine whether to increase or reduce the number of volunteers, which is conducive to further ensuring the rationality of the number of volunteers corresponding to the bus stops.

In some embodiments of the present disclosure, the public transport management platform may determine the distribution plan of order maintenance volunteers at the bus stops according to the relevant information of the bus stops. The public transport management platform may make overall arrangements for the number of volunteers corresponding to different bus stops to make the number of volunteers corresponding to different bus stops more reasonable.

Figure 4:
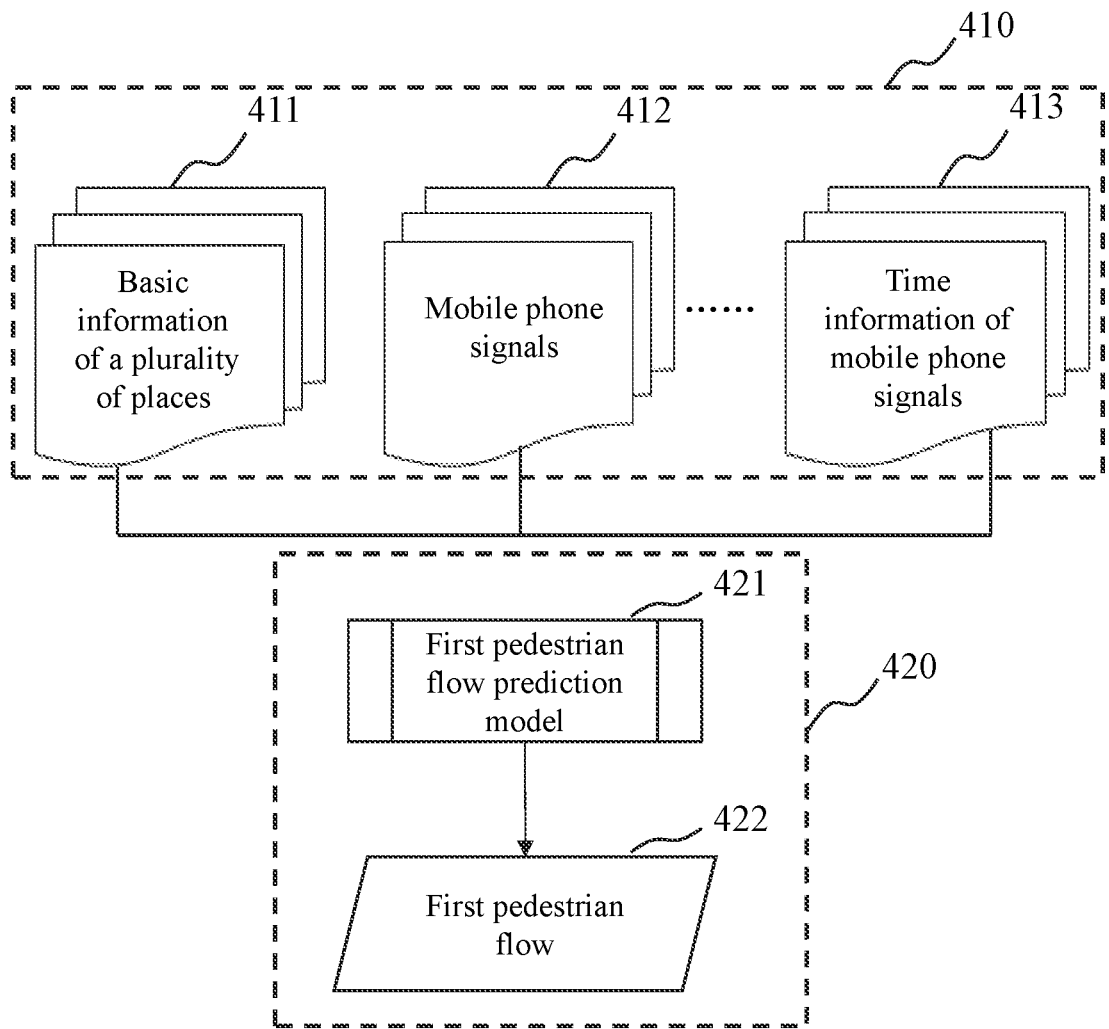
FIG. 4 is a schematic diagram illustrating an exemplary process for predicting a first pedestrian flow based on a first pedestrian flow prediction model according to some embodiments of the present disclosure.

FIG. 4 is a schematic diagram illustrating an exemplary processing for predicting the first pedestrian flow based on the first pedestrian flow prediction model according to some embodiments of the present disclosure. As shown in FIG. 4, process 400 may include following steps. In some embodiments, the process 400 may be performed by the public transport management platform 230.

In step 410, at least one of the basic information of a plurality of places, mobile phone signals or the time information of the mobile phone signals may be obtained.

The basic information of the plurality of places 411 may include the type of a place, the name of the place, the address of the place, etc. The type of the place may reflect the attribute of the place. For more content about the type of the place, please refer to the relevant description in FIG. 3. The name of place may reflect the attribute of the place and/or area to which it belongs to, etc. For example, the name of the place is Shangfangshan Forest Animal World, the above name reflects that the attribute of the place is an entertainment place, and the area of the place is in Shangfangshan. The name of the bus stop of the bus line often uses the same or similar name as the name of the place.

The mobile phone signals 412 may refer to the signals of the mobile devices used by the users. The number of the mobile devices may be determined by collecting mobile phone signals, and then the number of users using the mobile devices can be determined.

The time information of mobile phone signals 413 may refer to relevant information about the time of the mobile phone signals in the places. The time information of mobile phone signal 413 may include a start time of the mobile phone signal, an end time of the mobile phone signal, and the duration of the mobile phone signal. The start time of the mobile phone signal may refer to the time when the signal of the mobile phone enters a certain place. The end time of the mobile phone signal may refer to the time when the signal of the mobile phone leaves the certain place. The duration of the mobile phone signal may refer to the time period of the mobile phone signal at the certain place.

In some embodiments, the place management platform may obtain the at least one of the basic information of the plurality of places, the mobile phone signals or the time information of the mobile phone signals.

In some embodiments, the place management platform may obtain the basic information of the plurality of places through the network 120. For example, the place management platform may obtain the information of different places through the network 120, such as the types of the places, the names of the places, the addresses of the places, etc. In some embodiments, the place management platform may obtain the mobile phone signals and/or the time information of the mobile phone signals through the mobile phone signal collection devices. The mobile phone signal collection devices may refer to the collection devices in the places or near the places. The mobile phone signal collection devices may refer to devices that may be used to collect information or data related to mobile phone signals. For example, the mobile phone signal collection devices may collect the mobile phone signals, the start time of the mobile phone signals, the end time of the mobile phone signals, and the duration of mobile phone signals.

In step 420, the first pedestrian flow may be predicted by processing the at least one of the basic information of the plurality of places, the mobile phone signals or the time information of the mobile phone signals based on the first pedestrian flow prediction model.

In some embodiments, the predicted pedestrian flow may include a first pedestrian flow 422. The first pedestrian flow 422 may refer to the pedestrian flow in different places for a period of time after the current time predicted based on the data relating to the places. The data relating to the places may refer to the basic information of the places, the mobile phone signals, the time information of the mobile phone signals, or the like. In some embodiments, the first pedestrian flow may include a plurality of flow segments. The flow segments may refer to different stages of pedestrian flow preset in advance. For example, the flow segments may include a plurality of segments and different segments have different pedestrian flows. For example, flow segment 1 is 0 to 20 people/min. Flow segment 2 is 21 to 40 people/min. Flow segment 3 is 41 to 60 people/min. Flow segment 4 is 61 to 80 people/min. Flow segment 5 is greater than 80 people/min.

In some embodiments, the place management platform may process the at least one of the basic information of the plurality of places, the mobile phone signals or the time information of the mobile phone signals based on the first pedestrian flow prediction model 421 to predict the first pedestrian flow 422.

The first pedestrian flow prediction model 421 may refer to a model that can predict the pedestrian flow. In some embodiments, the type of the first pedestrian flow prediction model may include a Deep Neural Network (DNN), Recurrent Neural Network (RNN), or the like, and the selection of the model type may depend on the specific situation.

In some embodiments, an input of the first pedestrian flow prediction model may include at least one of the basic information of the plurality of places, the mobile phone signals or the time information of the mobile phone signals. An output of the first pedestrian flow prediction model may include the first pedestrian flow corresponding to the plurality of places, the flow segments of the first pedestrian flow corresponding to different places, or the like. For example, the first pedestrian flow corresponding to a certain place is 50 people/min, and the flow segment is the third flow segment (41 to 60 people/min). In some embodiments, the first pedestrian flow may belong to different flow segments, and the possibility of the first pedestrian flow in different flow segments is different. The output of the first pedestrian flow prediction model may include the confidence corresponding to the first pedestrian flow or the confidence corresponding to different flow segments. For more information about the confidence corresponding to the first pedestrian flow or the confidence corresponding to different flow segments, please refer to the relevant description in FIG. 7.

In some embodiments, the first pedestrian flow prediction model may be a DNN model.

In some embodiments, the first pedestrian flow prediction model may be obtained by training a plurality of training samples and labels.

In some embodiments, the training samples may include sample basic information corresponding to the plurality of different places, a sample mobile phone signals, time information of the sample mobile phone signals, or the like. The labels refer to the sample first pedestrian flow corresponding to the plurality of different places, the flow segment which the sample first pedestrian flow belongs, or the like. The training data may be obtained based on historical data, and the label of the training data may be determined by manual labeling or automatic labeling. The labeled training samples may be input into the initial first pedestrian flow prediction model. The parameters of the first pedestrian flow prediction model may be updated through training. When the initial first pedestrian flow prediction model meets the preset conditions, the training ends, and the trained first pedestrian flow prediction model is obtained.

In some embodiments, the input of the first pedestrian flow prediction model may also include code scanning admission data and/or person capacity of the plurality of places and/or related places. The code scanning admission data and/or person capacity may be obtained through the epidemic management platform.

In some embodiments, the plurality of places may include places where code scanning is required or places where code scanning is not required. For example, a shopping mall and a shopping center may need to scan the code to enter. A pedestrian street, and an open park may do not need to scan the code to enter. The relevant places may refer to places that have a correlation with the pedestrian flow in the above places. For example, the relevant places of the pedestrian street are a plurality of shops on the pedestrian street. The code scanning admission data may refer to the relevant data of the places where the user needs to scan the code for admission. The code scanning admission data may include the specific place of code scanning admission, the time period of code scanning admission, the number of code scanning admission, or the like. The person capacity may refer to the maximum number of people a place can hold. For example, a shopping mall has a capacity of 500 people.

In some embodiments, the place management platform may obtain code scanning admission data and/or person capacity of the plurality of places and/or related places through the epidemic management platform. The collection device of the code scanning information may be used to collect relevant data of the user's code scanning admission. The collection device of the code scanning information may upload the relevant data of the code scanning admission to the epidemic management platform. The epidemic management platform receives relevant data of the code scanning admission and stores it. The epidemic management platform may obtain the person capacity corresponding to different places through the network and store it. The place management platform may obtain the code scanning admission data and/or person capacity of the plurality of places and/or related places through the data stored in the epidemic management platform. The place management platform may input the code scanning admission data and/or person capacity of the plurality of places and/or related places into the first pedestrian flow prediction model to predict the first pedestrian flow in different places.

In some embodiments of the present disclosure, the place management platform may input the code scanning admission data and/or person capacity into the first pedestrian flow prediction model, which can improve the accuracy of the predicted first pedestrian flow.

In some embodiments, the first pedestrian flow prediction model may be a Long-Short Term Memory (LSTM) model and a Deep Neural Networks (DNN) model. The place management platform may process the code scanning admission data in a plurality of time periods before the current time based on the Long-Short Term Memory model, so as to determine the processed code scanning admission data. The place management platform may process the processed code scanning admission data, basic information of the plurality of places, mobile phone signals, time information of mobile phone signals, and person capacity based on the Deep Neural Network model, and predict the first pedestrian flow.

The processed code scanning admission data may reflect the relevant characteristics of code scanning admission data.

In some embodiments, the place management platform may input the code scanning admission data in a plurality of time periods before the current time of the plurality of places into the Long-Short Term Memory model. For example, the current time is 12:00, and the plurality of time periods before the current time may be 11:55 to 12:00, 11:50 to 11:55, or the like. The Long-Short Term Memory model may process the code scanning admission data in a plurality of time periods before the current time and outputs the processed code scanning admission data.

In some embodiments, the input of the Deep Neural Network model may include processed code scanning admission data, basic information of plurality of places, mobile phone signals, time information of the mobile phone signals, person capacity corresponding to different places, or the like. The output of the Deep Neural Network model may include the first pedestrian flow corresponding to the plurality of places, the flow segments of the first pedestrian flow corresponding to different places, or the like.

In some embodiments, the Long-Short Term Memory model and the Deep Neural Network model may be obtained through joint training based on a plurality of training samples and labels.

In some embodiments, the training samples may include code scanning admission data in a plurality of time periods before the sample current time, person capacity corresponding to different sample places, basic information of the plurality of sample places, sample mobile phone signals, time information of the sample mobile phone signals, or the like. The labels include the first sample pedestrian flow in the plurality of different sample places, the flow segments which the first sample pedestrian flow belongs to, or the like. The training data may be obtained based on historical data, and the label of the training data may be determined by manual annotation or automatic annotation. The labeled training samples may be input into the initial Long-Short Term Memory model and the initial Deep Neural Network model. The parameters of the initial Long-Short Term Memory model and the initial Deep Neural Network model may be updated by training. When the initial Long-Short Term Memory model and initial Deep Neural Network model meet the preset conditions, the training ends, and the trained Long-Short Term Memory model and the trained Deep Neural Network model may be obtained.

In some embodiments of the present disclosure, the code scanning admission data in a plurality of time periods before the current time may be processed through the Long-Short Term Memory model to determine the processed code scanning admission data. The place management platform may input the processed code scanning admission data and the corresponding person capacity of different places into the Deep Neural Network model to predict the first pedestrian flow, which can further improve the accuracy of the predicted first pedestrian flow.

In some embodiments of the present disclosure, the place management platform may process a plurality of information of the plurality of places through the first pedestrian flow prediction model, so as to predict the first pedestrian flow, which can improve the accuracy of the predicted first pedestrian flow.

Figure 5:
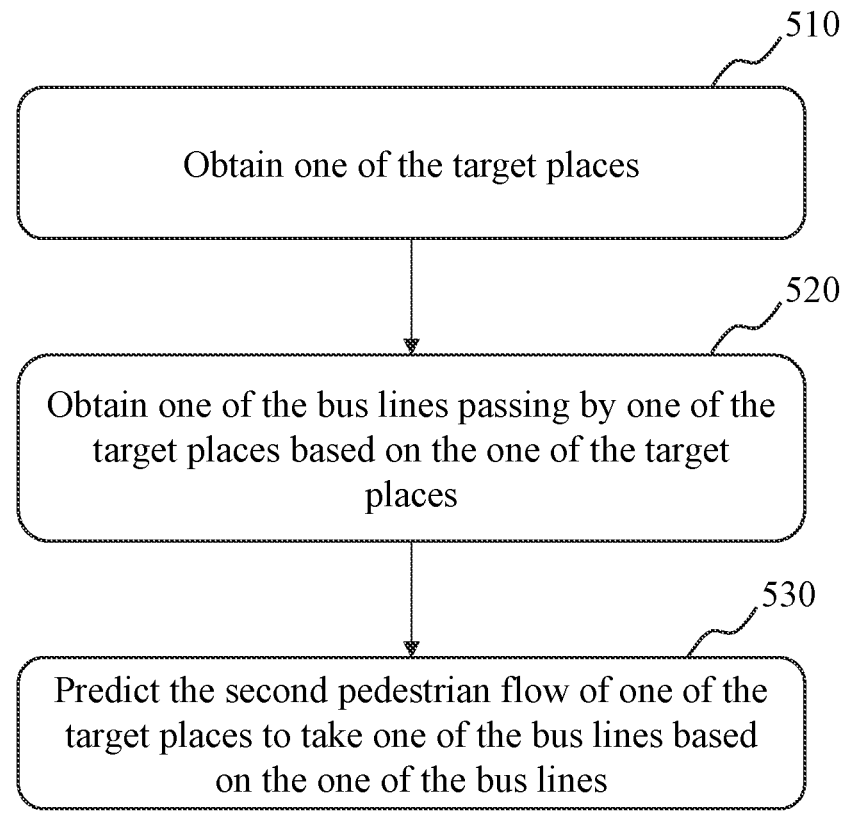
FIG. 5 is a flowchart illustrating an exemplary process for predicting a second pedestrian flow according to some embodiments of the present disclosure.

FIG. 5 is a flowchart illustrating an exemplary process for predicting second pedestrian flow according to some embodiments of the present disclosure. As shown in FIG. 5, the process 500 may include the following steps. In some embodiments, the process 500 may be performed by the public transport management platform.

In step 510, one of the target places may be obtained.

In some embodiments, the public transport management platform may obtain one of the target places. For example, the public transport management platform may randomly obtain a target place from a plurality of target places. Which one of the target places is obtained may be set according to the actual need.

In step 520, one of the bus lines passing by the one of the target places may be obtained based on the one of the target places.

The one of the bus lines may refer to any bus line passing by the target place. In some embodiments, the public transport management platform may obtain one of the bus lines passing by one of the target places randomly or according to preset rules.

In step 530, the second pedestrian flow of one of the target places to take one of the bus lines may be predicted based on the one of the bus lines.

In some embodiments, the predicted pedestrian flow may include a plurality of second pedestrian flow. The second pedestrian flow may refer to the predicted pedestrian flow of taking a bus line from a target place in a period of time after the current time. The second pedestrian flow may indicate how many users in a target place may take the bus line. In some embodiments, the second pedestrian flow may include a plurality of flow segments. For example, the flow segment of the second pedestrian flow includes the flow segment a from 0 to 10 people/min, the flow segment b from 11 to 20 people/min, flow segment c from 21 to 30 people/min, and flow segment d from 31 to 40 people/min.

In some embodiments, the public transport management platform may predict the second pedestrian flow of taking the one of the bus lines from the target place in a variety of ways. In some embodiments, the public transport management platform may predict the second pedestrian flow by the way that different users arrive at the target place. The way of a user to reach a certain place may be the same as the way to leave the certain place. For example, the user may reach at a certain shopping mall through Subway Line 1, and the user may also leave the certain shopping mall by taking Subway Line 1 when leaving. The public transport management platform may obtain the ways of different users reaching the target place in a past period of time, and then predict the second pedestrian flow of a bus line in the future.

In some embodiments, the public transport management platform may predict the second pedestrian flow through the second pedestrian flow prediction model. For details, please refer to the relevant description in FIG. 6.

In some embodiments of the present disclosure, the public transport management platform may predict the second pedestrian flow of taking one of the bus lines from one of the target places. The public transport management platform may adjust the departure frequency of the corresponding bus line based on the second pedestrian flow, which is conducive to improve the accuracy of adjustment of departure frequency of public transport and improve the operation efficiency of public transport.

Figure 6:
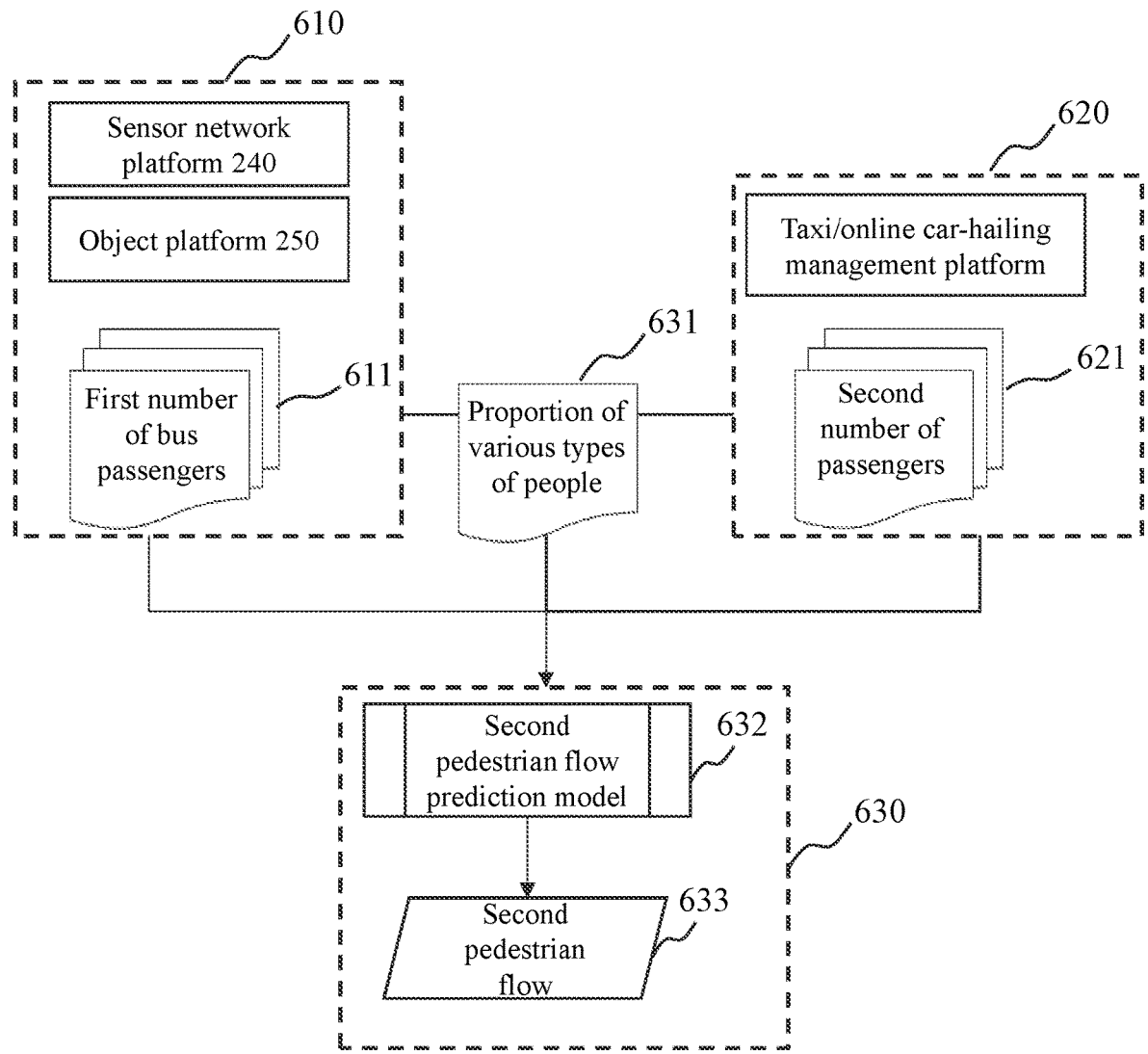
FIG. 6 is a schematic diagram illustrating an exemplary process for predicting a second pedestrian flow based on a second pedestrian flow prediction model according to some embodiments of the present disclosure.

FIG. 6 is a schematic diagram illustrating an exemplary process for predicting second pedestrian flow based on the second pedestrian flow prediction model according to some embodiments of the present disclosure. As shown in FIG. 6, the process 600 may include the following steps. In some embodiments, the process 600 may be performed by the public transport management platform 230.

In some embodiments, the public transport management platform may obtain the first number of bus passengers through the object platform based on the sensor network platform. The public transport management platform may obtain the second number of passengers through the taxi/online car-hailing management platform. The public transport management platform may predict the second pedestrian flow by processing at least one of the first number of bus passengers, the second number of passengers, and a proportion of various types of people to the first number of bus passengers, or a proportion of various types of people to the second number of passengers by the second pedestrian flow prediction model.

In step 610, the first number of bus passengers 611 may be obtained through the object platform 250 based on the sensor network platform 240.

The first number of bus passenger 611 may refer to the number of passengers who take the bus line to the target place in a period of time before the current time.

In some embodiments, the public transport management platform 230 may obtain the first number of bus passengers 611 through the object platform 250 based on the sensor network platform. For example, the bus line is bus No. 11. Based on the sensor network platform, the public transport management platform may obtain the first number of bus passengers reaching at the target place in a certain time period through the ticket checking device and camera monitoring device in the bus No. 11. The ticket checking device may include a counter. The camera monitoring device may count the number of passengers according to the passengers in the image. The object platform 250 may upload the first number of bus passengers to the public transportation management platform 230 through the sensor network platform 240.

In step 620, the second number of passengers 621 may be obtained through the taxi/online car-hailing management platform.

The second number of passengers 621 may refer to the number of passengers who reach at the target place by taxi/online car-hailing within a period of time before the current time. In some embodiments, the line of taxi/online car-hailing coincides with the bus line to a certain extent. For example, the bus line is bus No. 11, the departure station of bus No. 11 is the Sunshine Community, and it goes through 10 stops to reach the stop of commercial street. The pick-up place of taxi/online car-hailing line may be Sunshine community or nearby community. The route of taxi/online car-hailing line may overlap with the line through the 10 stops of the above bus No. 11 in a certain degree.

In some embodiments, the public transport management platform 230 may obtain the second number of passengers 621 through the taxi/online car-hailing management platform. For example, the public transport management platform may obtain the second number of passengers through the relevant information in the taxi/online car-hailing management platform. The relevant information may include the number of passengers, the pick-up location, the drop off location, the drop off time, or the like. The public transport management platform may obtain the second number of passengers arriving at the target place in a certain period of time through the above relevant information in the taxi/online car-hailing management platform.

In step 630, at least one the first number of bus passengers, the second number of passengers, the proportion of various types of people to the first number of bus passengers, or a proportion of various types of people to the second number of passengers may be processed by the second pedestrian flow prediction model to predict the second pedestrian flow.

The proportion of various types of people 631 may refer to a proportion of the number of people in different types of people to the number of passengers (e.g., first number of bus passengers, or second number of passengers). The various types of people may include children, elderly, young people, or the like. In some embodiments, the public transport management platform 230 may obtain the proportion of various types of people 631 through the object platform 250 and the taxi/online car-hailing management platform based on the sensor network platform. For example, the public transport management platform may obtain the proportion of various types of people through the ticket checking device and camera monitoring device in the bus. For example, the elderly card may be displayed when the elderly swipes the card, the student card may be displayed when children swipe the card, and the ordinary card may be displayed when young people swipe the card. The public transport management platform may obtain the number of different types of people through the ticket checking device. The public transport management platform may calculate and obtain the proportion of various types of people in combination with, e.g., the first number of bus passengers.

The second pedestrian flow prediction model 632 may refer to a model that may predict the pedestrian flow of a bus line. In some embodiments, the type of the second pedestrian flow prediction model 632 may include a Deep Neural Network, or the like, and the selection of the model type may depend on the specific situation.

In some embodiments, the input of the second pedestrian flow prediction model may include the first number of bus passengers 611, the second number of passengers 621, the proportion of various types of people 631, or the like. The output of the second pedestrian flow prediction model may include the second pedestrian flow 633, the flow segments which the second pedestrian flow belongs to, or the like. In some embodiments, the second pedestrian flow may belong to different flow segments, and the possibility of the second pedestrian flow in different flow segments may be different. The output of the second pedestrian flow prediction model may include the confidence corresponding to the second pedestrian flow or the confidence corresponding to different flow segments. For more information about the confidence corresponding to the second pedestrian flow or the confidence corresponding to different flow segments, please refer to the relevant description in FIG. 7.

In some embodiments, the second pedestrian flow prediction model may be obtained by training a plurality of training samples and labels.

In some embodiments, the training samples include the first number of sample bus passengers corresponding to a bus line, the second number of sample passengers, the proportion of various types of sample people to the first number of sample bus passengers and/or the second number of sample passengers, or the like. The label may refer to the second sample pedestrian flow corresponding to a certain bus line, the flow segment which the sample second pedestrian flow belongs to, or the like. The training data may be obtained based on historical data, and the label of training data may be determined by manual annotation or automatic annotation. The training samples with the labels may be input into the initial second pedestrian flow prediction model. the parameters of the second pedestrian flow prediction model may be updated through training. When the initial second pedestrian flow prediction model meets the preset conditions, the training ends, and the trained second pedestrian flow prediction model may be obtained.

In some embodiments, the input of the second pedestrian flow prediction model may also include epidemic situation characteristics.

The epidemic situation characteristics may reflect the characteristics of the epidemic situations in a city. The epidemic situation may include whether the city contains high-risk or medium-risk areas, the number of medium/high-risk areas, whether a certain bus line passes by medium/high-risk areas and the distance between the certain bus line and medium/high-risk areas.

In some embodiments of the present disclosure, the public transport management platform may predict the second pedestrian flow by inputting the epidemic situation characteristics into the second pedestrian flow prediction model. The epidemic situation in the city may be comprehensively considered, which is conducive to providing a reference for the subsequent adjustment of departure frequency of public transport.

In some embodiments, the public transport management platform 230 may process the first number of bus passengers, the second number of passengers, the proportion of various types of people to the number of first bus passengers, or a proportion of various types of people to the number of second passengers, and/or the epidemic situation characteristics based on the second pedestrian flow prediction model, so as to predict the second pedestrian flow 633.

In some embodiments of the present disclosure, the public transport management platform may predict the second pedestrian flow of a bus line based on the second pedestrian flow prediction model. Through the above methods, the accuracy of the predicted second pedestrian flow can be improved, which is conducive to improving the accuracy of the adjustment of departure frequency of public transport.

Figure 7:
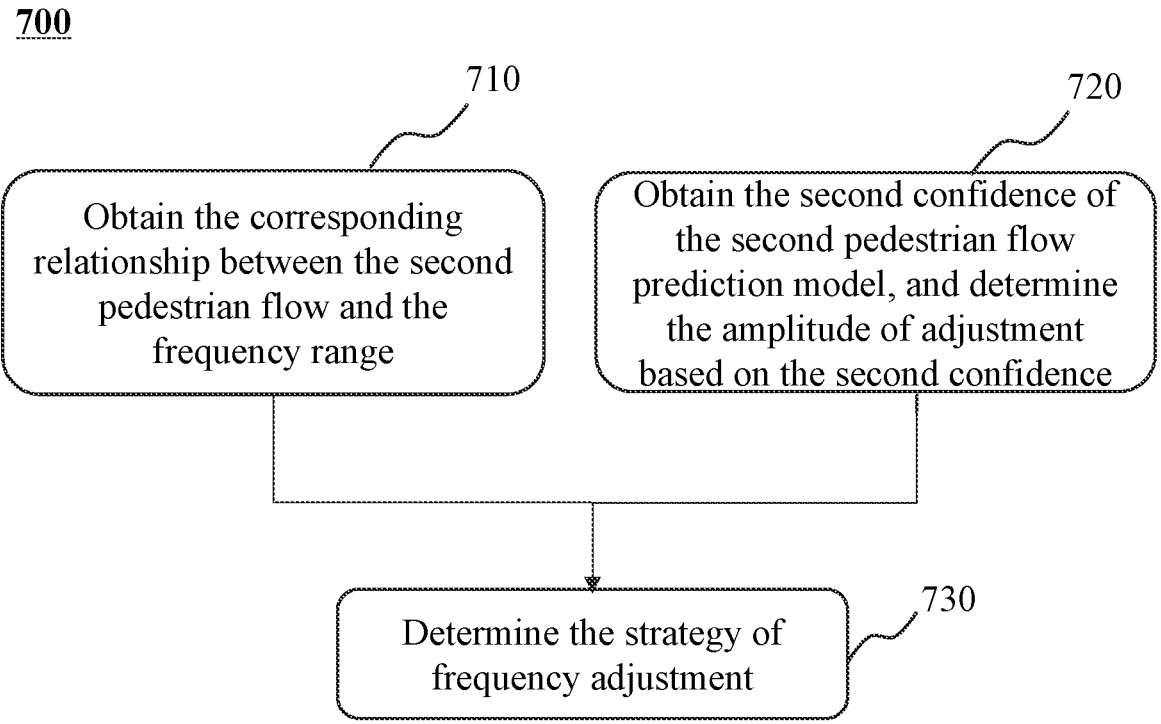
FIG. 7 is a schematic diagram illustrating an exemplary process for determining a strategy of frequency adjustment based on a second pedestrian flow according to some embodiments of the present disclosure.

FIG. 7 is a schematic diagram illustrating an exemplary process for determining a strategy of frequency adjustment based on a second pedestrian flow according to some embodiments of the present disclosure. As shown in FIG. 7, process 700 may include the following steps. In some embodiments, the process 700 may be performed by the public transport management platform 230.

In some embodiments, the adjustment of departure frequency of the bus line may include a strategy of frequency adjustment. The public transport management platform 230 may determine the strategy of frequency adjustment based on the second pedestrian flow.

The frequency may refer to the number of times corresponding to the departure frequency. For example, the departure frequency is 3 times/hour, the corresponding number of times is 3, and the frequency is 3. The strategy of frequency adjustment may refer to the strategy of adjusting the frequency corresponding to a bus line.

In some embodiments, the public transport management platform may determine the strategy of frequency adjustment based on the value of the second pedestrian flow. For example, the second pedestrian flow is 10 people/min, and the public transport management platform may determine that the strategy of frequency adjustment is to adjust the frequency from the original 3 to 4. As another example, the second pedestrian flow is 20 people/min, and the public transport management platform may determine that the strategy of frequency adjustment is to adjust the frequency from the original 3 to 6.

In step 710, the corresponding relationship between the second pedestrian flow and the frequency range may be obtained. The adjusted frequency range may be determined based on the corresponding relationship.

In some embodiments, the strategy of frequency adjustment may include the frequency range of adjustment.

The frequency range of adjustment may refer to the range of the number of times corresponding to the departure frequency. In some embodiments, the frequency range may include a plurality of frequency ranges. The frequency range of adjustment may be one of the plurality of frequency ranges. For example, the frequency range includes 1 to 4, 5 to 8, 9 to 12, 13 to 16, or the like. The above frequency range may be the number of times for buses to depart per hour.

In some embodiments, there may be a corresponding relationship between the second pedestrian flow and the frequency range. The corresponding relationship between the second pedestrian flow and the frequency range may be as follows: the frequency range corresponding to flow segment a (0 to 10 person/min) is 1 to 4. The frequency range of flow segment b (11 to 20 people/min) is 5 to 8. The frequency range of flow segment c (21 to 30 people/min) is 9 to 12. The frequency range of flow segments d (31 to 40 person/min) is 13 to 16.

In some embodiments, the public transport management platform may obtain the corresponding relationship between the preset second pedestrian flow and the frequency range. The public transport management platform may set the corresponding relationship between the second pedestrian flow and the frequency range according to the needs. In some embodiments, the public transport management platform may determine the frequency range of adjustment based on the corresponding relationship. For example, the second pedestrian flow is 15 people/min. 15 people/min corresponds to flow segment b. The frequency range of flow segment b is 5 to 8. The public transport management platform may determine the frequency range of adjustment is from 5 to 8.

In some embodiments of the present disclosure, the public transport management platform may determine the frequency range of adjustment based on the corresponding relationship between the second pedestrian flow and the frequency range. The public transport management platform may further determine the specific value of the departure frequency based on the approximate range of the departure frequency of the bus line. With the above methods, the accuracy of departure frequency can be guaranteed to a certain extent.

In step 720, the second confidence of the second pedestrian flow prediction model may be obtained, and the amplitude of adjustment may be determined based on the second confidence.

In some embodiments, the strategy of frequency adjustment may include the amplitude of adjustment.

The amplitude of adjustment may refer to the degree of increase or decrease in frequency. The specific value of the frequency corresponding to a certain bus line may be determined through the amplitude of adjustment.

The second confidence may refer to the credibility degree of the second pedestrian flow prediction model. The second confidence may be expressed by a value between 0 and 1. The larger the value, the more credible the second pedestrian flow output by the second pedestrian flow prediction model.

In some embodiments, the public transport management platform may obtain the second confidence through the second pedestrian flow prediction model. For example, the second pedestrian flow prediction model may output the confidence corresponding to the second pedestrian flow. The public transport management platform may determine the confidence corresponding to the second pedestrian flow as the second confidence of the second pedestrian flow prediction model. As another example, the second pedestrian flow prediction model may output the flow segment of the second pedestrian flow and the confidence corresponding to the flow segment. The public transport management platform may determine the maximum confidence corresponding to the flow segment as the second confidence of the second pedestrian flow prediction model. For example, the output of the second pedestrian flow prediction model may be as follows: flow segment a is 0 to 10 people/min, and the confidence corresponding to the flow segment a is 0.3; flow segment b is 11 to 20 people/min, and the confidence corresponding to the flow segment b is 0.7. The public transport management platform may determine the confidence of 0.7 corresponding to the flow segment b as the second confidence of the second pedestrian flow prediction model.

In some embodiments, the public transport management platform may determine the amplitude of the adjustment in a variety of ways.

In some embodiments, the public transport management platform may determine the amplitude of adjustment based on the relationship between the second confidence and a confidence threshold. The confidence threshold may refer to the minimum value of the credibility degree of the second pedestrian flow prediction model. For example, the confidence threshold may be 0.8 or 0.9. For example, when the second confidence is less than the confidence threshold, the public transport management platform may determine that the amplitude of adjustment is 0. As another example, when the second confidence is greater than or equal to the confidence threshold, the public transport management platform may determine the amplitude of adjustment based on a calculation formula. The public transport management platform may set the calculation formula according to the actual demand. For example, the calculation formula is $A=dZ_2+e$, where A refers to the amplitude of adjustment, $Z_2$ refers to the second confidence, d and e refer to a constant (for example, 1.6 and 0.6 respectively), and the value of the constant may be set according to the actual demand. When $Z_2$ is 0.85, A is 1.96, which closes to 2. The public transport management platform may determine the amplitude of adjustment as 2.

In some embodiments, the public transport management platform may determine the amplitude of adjustment based on the relationship between the first confidence and the confidence threshold, and the second confidence and the confidence threshold.

The first confidence may refer to the credibility degree of the first pedestrian flow prediction model. The first confidence may be expressed by a value between 0 and 1. The larger the value, the more credible the first pedestrian flow output by the first pedestrian flow prediction model.

In some embodiments, the public transport management platform may obtain the first confidence through the first pedestrian flow prediction model. In the present disclosure, the content of obtaining the first confidence may be similar to the content of obtaining the second confidence, and the difference may be only that the first confidence is obtained through the first pedestrian flow prediction model. The second confidence may be obtained through the second pedestrian flow prediction model, so for more information about obtaining the first confidence, see obtaining the second confidence, which is not be repeated here.

In some embodiments, when the second confidence is less than the confidence threshold, the public transport management platform may determine the amplitude of adjustment is 0. As another example, when the second confidence is greater than or equal to the confidence threshold, the public transport management platform may determine the amplitude of adjustment based on the calculation formula. For example, the calculation formula is $B=cZ_1+dZ_2+e$, where B refer s to the amplitude of adjustment, $Z_1$ refers to the first confidence, $Z_2$ refers to the second confidence, c, d and e refer to a constant (for example, 1.2, 1.8, and 0.4 respectively), and the value of the constant may be set according to the actual demand. When $Z_1$ is 0.8, $Z_2$ is 0.9, A is 2.98, which closes to 3. The public transport management platform may determine the amplitude of adjustment is 3.

In some embodiments, the public transport management platform may determine the amplitude of adjustment based on the relationship between the first confidence and a confidence reference value, and second confidence and the confidence reference value.

The confidence reference value may refer to the minimum value of the credibility degree of the first pedestrian flow prediction model and the second pedestrian flow prediction model. For example, the confidence reference value may be 1.2 or 1.3, or the like. In some embodiments, when the sum of the first confidence and the second confidence is less than the confidence reference value, the public transport management platform may determine that the amplitude of adjustment is 0. In some embodiments, when the sum of the first confidence and the second confidence is greater than or equal to the confidence reference value, the public transport management platform may determine the amplitude of adjustment based on the calculation formula. The public transport management platform may set the calculation formula according to the actual demand. For example, the calculation formula is $C=(Z_1+Z_2-Z_0)/Z_0*n$, where, C refers to the amplitude of adjustment, $Z_1$ refers to the first confidence, $Z_2$ refers to the second confidence, $Z_0$ refers to the confidence reference value, n refers to the difference between the maximum value and minimum value of the frequency range (such as 4, or the like.). When $Z_1$ is 0.85, $Z_2$ is 0.95, $Z_0$ is 1.2, C is 2. The public transport management platform may determine the amplitude of adjustment is 2.

In some embodiments of the present disclosure, the public transport management platform may determine the amplitude of adjustment based on the second confidence of the second pedestrian flow prediction model. The public transport management platform may determine the strategy of frequency adjustment according to the amplitude of adjustment, so as to ensure the accuracy of the departure frequency of the bus line.

In step 730, the strategy of frequency adjustment may be determined.

In some embodiments, the strategy of frequency adjustment may include the frequency range of the adjustment and the amplitude of adjustment. The public transport management platform may determine the strategy of frequency adjustment of the bus line based on the frequency range of adjustment and the amplitude of adjustment of the bus line.

For example, the strategy of frequency adjustment of bus lines may be that the sum of the minimum value in the frequency range of adjustment and the amplitude of adjustment is the corresponding frequency of a bus line. For example, the frequency range of adjustment corresponding to the bus No. 11 determined in step 710 is 5 to 8, and 5 to 8 is the frequency range of adjustment corresponding to one hour. The amplitude of adjustment corresponding to the bus No. 11 determined in step 720 is 2. The public transport management platform may determine that the minimum value in the frequency range of adjustment is 5, and the corresponding frequency of bus No. 11 is 7 (i.e., 5+2).

Another example is when the sum of the minimum value in the frequency range of adjustment and the amplitude of adjustment is greater than the maximum value in the frequency range of adjustment. The strategy of frequency adjustment of the bus lines is that the maximum value in the frequency range of adjustment is the corresponding frequency of a bus line.

In some embodiments, the public transport management platform may determine the departure frequency of a bus line to be adjusted based on the corresponding frequency of the bus line. As mentioned in the above example, the corresponding frequency of bus No. 11 is 7, and the time corresponding to the frequency 7 is one hour. The departure frequency of the bus No. 11 to be adjusted is 7 times/hour. The public transport management platform may adjust the departure frequency of the bus No. 11 to 7 times/hour.

In some embodiments of the present disclosure, the second pedestrian flow may represent how many users in a target place may take the bus line. The public transport management platform determines the strategy of frequency adjustment based on the second pedestrian flow, which can ensure the accuracy of the departure frequency corresponding to the bus line.

It should be noted that the description of the above-mentioned process is only for examples and descriptions, and the scope of the present disclosure is not limited. For those skilled in the art, various amendments and changes may be made to the process under the guidance of the present disclosure. However, these amendments and changes are still within the scope of the present disclosure.

The basic concepts have been described above. Obviously, for those skilled in the art, the above-detailed disclosure is only an example and does not constitute a limitation of the present disclosure. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." Unless otherwise stated, "about", "approximate" or "substantially" may indicate a ±20% variation of the value it describes. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A method of public transport management in a smart urban, wherein the method is performed by a processor of a public transport management platform, the method comprising:

obtaining predicted pedestrian flow at a plurality of places through a place management platform, wherein the predicted pedestrian flow includes first pedestrian flow and second pedestrian flow, the first pedestrian flow is a pedestrian flow in different places where a user needs to scan the code for admission for a period of time after current time predicted based on data relating to the places, and the second pedestrian flow is a predicted pedestrian flow of taking a bus line from a target place for a period of time after the current time;

generating a plurality of training samples and labels, wherein the plurality of training samples include code scanning admission data in a plurality of time periods before a sample current time, a person capacity corresponding to different sample places, basic information of the plurality of different sample places, sample mobile phone signals, time information of the sample mobile phone signals, and the labels include a first sample pedestrian flow in the plurality of different sample places and flow segments which the first sample pedestrian flow belongs to;

inputting the plurality of training samples and the labels into an initial Long-Short Term Memory (LSTM) model and an initial Deep Neural Network (DNN) model;

training the initial LSTM model and the initial DNN model to obtain a LSTM model and a DNN model through joint training based on the plurality of training samples and labels;

predicting the first pedestrian flow using the LSTM model and the DDN model comprises:

generating at least one of basic information of the plurality of places, mobile phone signals, or time information of the mobile phone signals;

wherein the basic information includes a type of a place, the mobile phone signals refer to data obtained through mobile phone signal collection devices in the plurality of places and/or related places, and the time information of the mobile phone signals includes start time of the mobile phone signals and end time of the mobile phone signals;

determining processed code scanning admission data by processing code scanning admission data in the plurality of time periods before the current time based on the LSTM model; and predicting the first pedestrian flow by processing at least one of the processed code scanning admission data, the basic information of the plurality of places, the mobile phone signals, the time information of the mobile phone signals, or the person capacity based the DNN model, wherein the code scanning admission data and the person capacity are obtained through an epidemic management platform;

updating parameters of the initial LSTM model and the initial DNN model by training; and obtaining the LSTM model and the DNN model until the initial LSTM model and the initial DNN model meet preset conditions;

predicting the second pedestrian flow comprises:

obtaining bus lines passing by target places via the network from the processor, wherein the obtaining bus lines passing by target places includes obtaining one of the bus lines passing by the one of the target places, and predicting the second pedestrian flow of the one of the target places to take the one of the bus lines based on the one of the bus lines, wherein the predicting the second pedestrian flow of the one of the target places to take the one of the bus lines based on the one of the bus lines comprises:
  obtaining a first number of bus passengers through an object platform based on a sensor network platform, wherein the first number of bus passengers is a number of passengers who take the bus line to the target place for a period of time before the current time;
  obtaining a second number of passengers through a taxi/online car-hailing management platform, wherein the second number of passengers is a number of passengers who arrive at the target place by taxi/online car-hailing for a period of time before the current time;
  processing at least one of the first number of bus passengers, the second number of passengers, a proportion of various types of people in the first number of bus passengers, or a proportion of various types of people in the second number of passengers by using a second pedestrian flow prediction model; and
  predicting, based on the first pedestrian flow as well as the at least one of the first number of bus passengers, the second number of passengers, the proportion of various types of people in the first number of bus passengers, or the proportion of various types of people in the second number of passengers processed, the second pedestrian flow;
determining target places where the predicted pedestrian flow is greater than a pedestrian flow threshold based on the predicted pedestrian flow at the plurality of places;
obtaining bus lines passing by the target places, and adjusting departure frequency of the bus lines; and
feeding the departure frequency of the bus lines back to the user in responding to a query instruction input by the user through a user terminal.

2. The method of claim 1, wherein the adjusting departure frequency of the bus lines includes determining a strategy of frequency adjustment based on the second pedestrian flow.

3. The method of claim 2, wherein the strategy of frequency adjustment comprises a frequency range of adjustment, wherein the determining the strategy of frequency adjustment based on the second pedestrian flow comprises: obtaining a corresponding relationship between the second pedestrian flow and the frequency range; and determining the frequency range of adjustment based on the corresponding relationship.

4. The method of claim 2, wherein the strategy of frequency adjustment comprises amplitude of adjustment, wherein the determining the strategy of frequency adjustment based on the second pedestrian flow comprises: obtaining a second confidence of the second pedestrian flow prediction model; and determining the amplitude of adjustment based on the second confidence.

5. The method of claim 1, wherein the method further comprises: obtaining bus stops related to the target places; and determining a distribution plan of order maintenance volunteers at the bus stops based on relevant information of the bus stops.

6. An Internet of Things system of public transportation management in a smart urban, wherein the Internet of Things system includes a user platform, a service platform, a public transport management platform, a sensor network platform, and an object platform,
  a storage configured to store computer instructions, and
  a processor of the public transport management platform in communication with the storage, when executing the computer instructions, the processor is directed to cause the Internet of Things system to perform operations including:
  obtaining predicted pedestrian flow at a plurality of places through a place management platform, wherein the predicted pedestrian flow includes first pedestrian flow and second pedestrian flow, the first pedestrian flow is a pedestrian flow in different places for a period of time after the current time predicted based on the data relating to the places, and the second pedestrian flow is a predicted pedestrian flow of taking a bus line from a target place in a period of time after the current time;
  generating a plurality of training samples and labels, wherein the plurality of training samples include code scanning admission data in a plurality of time periods before a sample current time, a person capacity corresponding to different sample places, basic information of the plurality of different sample places, sample mobile phone signals, time information of the sample mobile phone signals, and the labels include a first sample pedestrian flow in the plurality of different sample places and flow segments which the first sample pedestrian flow belongs to;
  inputting the plurality of training samples and the labels into an initial Long-Short Term Memory (LSTM) model and an initial Deep Neural Network (DNN) model;
  training the initial LSTM model and the initial DNN model to obtain a LSTM model and a DNN model through joint training based on the plurality of training samples and labels;
  predicting the first pedestrian flow using the LSTM model and the DDN model comprises:
    generating at least one of basic information of the plurality of places, mobile phone signals, or time information of the mobile phone signals;
    wherein the basic information includes a type of a place, the mobile phone signals refer to data obtained through mobile phone signal collection devices in the plurality of places and/or related places, and the time information of the mobile phone signals includes start time of the mobile phone signals and end time of the mobile phone signals;
  determining processed code scanning admission data by processing code scanning admission data in the plurality of time periods before the current time based on the LSTM model; and
  predicting the first pedestrian flow by processing at least one of the processed code scanning admission data, the basic information of the plurality of places, the mobile phone signals, the time information of the mobile phone signals, or the person capacity based on the DNN model, wherein the code scanning admission data and the person capacity are obtained through an epidemic management platform;
  updating parameters of the initial LSTM model and the initial DNN model by training;

and obtaining the LSTM model and the DNN model until the initial LSTM model and the initial DNN model meet preset conditions;

predicting the second pedestrian flow comprises:
obtaining bus lines passing by target places, wherein the obtaining bus lines passing by target places includes obtaining one of the bus lines passing by the one of the target places, and predicting the second pedestrian flow of the one of the target places to take the one of the bus lines based on the one of the bus lines, wherein the predicting the second pedestrian flow of the one of the target places to take the one of the bus lines based on the one of the bus lines specifically comprises:
obtaining a first number of bus passengers through an object platform based on a sensor network platform, wherein the first number of bus passengers is a number of passengers who take the bus line to the target place for a period of time before the current time;
obtaining a second number of passengers through a taxi/online car-hailing management platform, wherein the second number of passengers is a number of passengers who arrive at the target place by taxi/online car-hailing for a period of time before the current time;
processing at least one of the first number of bus passengers, the second number of passengers, a proportion of various types of people in the first number of bus passengers, or a proportion of various types of people in the second number of passengers by using a second pedestrian flow prediction model; and
predicting, based on the first pedestrian flow as well as the at least one of the first number of bus passengers, the second number of passengers, the proportion of various types of people in the first number of bus passengers, or the proportion of various types of people in the second number of passengers processed, the second pedestrian flow;
determining target places where the predicted pedestrian flow is greater than a pedestrian flow threshold based on the predicted pedestrian flow at the plurality of places;
obtaining bus lines passing by the target places, and adjusting departure frequency of the bus lines; and
feeding the departure frequency of the bus lines back to the user in responding to a query instruction input by the user through a user terminal.

7. The Internet of Things system of claim 6, wherein the adjusting includes a strategy of frequency adjustment, the public transport management platform is configured to further perform the following operations including: determining a strategy of frequency adjustment based on the second pedestrian flow.

8. The Internet of Things system of claim 7, wherein the strategy of frequency adjustment includes a frequency range of adjustment, the public transport management platform is configured to further perform the following operations including:
obtaining a corresponding relationship between the second pedestrian flow and the frequency range; and
determining the frequency range of adjustment based on the corresponding relationship.

9. The Internet of Things system of claim 7, wherein the strategy of frequency adjustment includes an amplitude of adjustment, and the public transport management platform is configured to further perform the following operations including: obtaining a second confidence of the second pedestrian flow prediction model; and determining the amplitude of adjustment based on the second confidence.

10. A non-transitory computer-readable storage medium storing computer instructions, wherein when reading the computer instructions in the storage medium, a computer executes a method comprising:
obtaining predicted pedestrian flow at a plurality of places through a place management platform, wherein the predicted pedestrian flow includes first pedestrian flow and second pedestrian flow, the first pedestrian flow is a pedestrian flow in different places where a user needs to scan the code for admission for a period of time after current time predicted based on data relating to the places, and the second pedestrian flow is a predicted pedestrian flow of taking a bus line from a target place for a period of time after the current time;
generating a plurality of training samples and labels, wherein the plurality of training samples include code scanning admission data in a plurality of time periods before a sample current time, a person capacity corresponding to different sample places, basic information of the plurality of different sample places, sample mobile phone signals, time information of the sample mobile phone signals, and the labels include a first sample pedestrian flow in the plurality of different sample places and flow segments which the first sample pedestrian flow belongs to;
inputting the plurality of training samples and the labels into an initial Long-Short Term Memory (LSTM) model and an initial Deep Neural Network (DNN) model;
training the initial LSTM model and the initial DNN model to obtain a LSTM model and a DNN model through joint training based on the plurality of training samples and labels;
predicting the first pedestrian flow using the LSTM model and the DDN model comprises:
generating at least one of basic information of the plurality of places, mobile phone signals, or time information of the mobile phone signals;
wherein the basic information includes a type of a place, the mobile phone signals refer to data obtained through mobile phone signal collection devices in the plurality of places and/or related places, and the time information of the mobile phone signals includes start time of the mobile phone signals and end time of the mobile phone signals;
determining processed code scanning admission data by processing code scanning admission data in the plurality of time periods before the current time based on the LSTM model; and
predicting the first pedestrian flow by processing at least one of the processed code scanning admission data, the basic information of the plurality of places, the mobile phone signals, the time information of the mobile phone signals, or the person capacity based on the DNN model, wherein the code scanning admission data and the person capacity are obtained through an epidemic management platform;
updating parameters of the initial LSTM model and the initial DNN model by training; and
obtaining the LSTM model and the DNN model until the initial LSTM model and the initial DNN model meet preset conditions;

predicting the second pedestrian flow comprises:
obtaining bus lines passing by target places via the network from the processor, wherein the obtaining bus lines passing by target places includes obtaining one of the bus lines passing by the one of the target places, and predicting the second pedestrian flow of the one of the target places to take the one of the bus lines based on the one of the bus lines, wherein the predicting the second pedestrian flow of the one of the target places to take the one of the bus lines based on the one of the bus lines comprises:
obtaining a first number of bus passengers through an object platform based on a sensor network platform, wherein the first number of bus passengers is a number of passengers who take the bus line to the target place for a period of time before the current time;
obtaining a second number of passengers through a taxi/online car-hailing management platform, wherein the second number of passengers is a number of passengers who arrive at the target place by taxi/online car-hailing for a period of time before the current time;
processing at least one of the first number of bus passengers, the second number of passengers, a proportion of various types of people in the first number of bus passengers, or a proportion of various types of people in the second number of passengers by using a second pedestrian flow prediction model; and
predicting, based on the first pedestrian flow as well as the at least one of the first number of bus passengers, the second number of passengers, the proportion of various types of people in the first number of bus passengers, or the proportion of various types of people in the second number of passengers processed, the second pedestrian flow;
determining target places where the predicted pedestrian flow is greater than a pedestrian flow threshold based on the predicted pedestrian flow at the plurality of places;
obtaining bus lines passing by the target places, and adjusting departure frequency of the bus lines; and
feeding the departure frequency of the bus lines back to the user in responding to a query instruction input by the user through a user terminal.

* * * * *